United States Patent
Schönebeck

[11] Patent Number: 6,152,523
[45] Date of Patent: Nov. 28, 2000

[54] EDGE GAP SEALING ARRANGEMENT FOR THE LID OF AN AUTOMOBILE ROOF

[75] Inventor: Horst Schönebeck, Gelnhausen, Germany

[73] Assignee: Meritor Automotive GmbH, Germany

[21] Appl. No.: 09/139,249

[22] Filed: Aug. 25, 1998

Related U.S. Application Data

[63] Continuation of application No. 08/859,456, May 20, 1997, Pat. No. 5,882,066.

[30] Foreign Application Priority Data

Jun. 21, 1996 [DE] Germany .................. 196 24 715

[51] Int. Cl.$^7$ ....................................... B60J 10/10
[52] U.S. Cl. ...................... 296/216.09; 49/482.1; 49/498.1
[58] Field of Search ........... 296/216.01, 216.06–216.07, 296/216.09; 49/482.1, 493.1, 498.1, 499.1; 52/204.597

[56] References Cited

U.S. PATENT DOCUMENTS

| | | |
|---|---|---|
| 3,411,246 | 11/1968 | Miller ...................................... 49/499.1 |
| 4,571,889 | 2/1986 | Labelle ................. 49/499.1 X |
| 4,666,206 | 5/1987 | Hough . | 
| 5,882,066 | 3/1999 | Schonebeck ..................... 296/216.09 |

FOREIGN PATENT DOCUMENTS

| | | |
|---|---|---|
| 0479636A1 | 9/1991 | European Pat. Off. . |
| 2929837B1 | 1/1981 | Germany . |
| 94180903 U | 1/1995 | Germany . |
| 94 18 090 U | 2/1995 | Germany . |
| 652706 | 6/1954 | United Kingdom . |

*Primary Examiner*—Dennis H. Pedder
*Attorney, Agent, or Firm*—Howard & Howard

[57] ABSTRACT

An edge gap sealing arrangement for the rigid lid (1) of an automobile sliding roof, which arrangement is moulded on to the peripheral edge of the lid (1) to form a frame body (3). The frame body has an initially free edge strip (5) extending outwards, which is bent over to form a hollow chamber (7). The strip is arranged to be adjustably secured preferably from below to the frame body (3) with its outer edge adjacent to the peripheral edge of the lid. The seal so formed is adjustable as to its cross-section and the width of the hollow chamber (7) so that it is adapted to dimensional variations and irregularities in the edge gap. Preferably at the outer edge of the edge strip (5) an inner surface portion (8) is provided, which after the edge strip (5) has been bent to form the hollow chamber (7), is adjustably secured to a counter-surface (9) of the frame body (3) by means of a clamping profile strip (10). The clamping profile strip (10) engages into a clamping groove (11) of the frame body (3).

6 Claims, 2 Drawing Sheets

6,152,523

EDGE GAP SEALING ARRANGEMENT FOR THE LID OF AN AUTOMOBILE ROOF

This is a continuation of application Ser. No. 08/859,456 filed on May 20, 1997, now U.S. Pat. No. 5,882,066 and which claims priority to German Application No. 196 24 715.2-2 filed on Jun. 21, 1996.

BACKGROUND OF THE INVENTION

1. Field of the Invention

This invention relates to an edge gap sealing arrangement for the rigid lid of an automobile opening roof particularly a sliding roof.

2. Description of the Prior Art

Edge gap sealing arrangements for this purpose are well known such as form a watertight seal of the closed lid of the sliding roof with respect to the peripheral rim, surrounding the lid, of the roof opening which seats the closed lid. Such known sealing arrangements include those which have a hollow sealing element formed from an injection moulding having a strip an edge of which is bent over and secured to form the hollow. This arrangement can indeed, by elastic deformation, accommodate slight differences in width of the edge gap and also slight unevenness, that is fluctuations in width, at the rims or edges of the roof opening and lid which in the ideal case are aligned continuously parallel and at uniform spacing, but larger differences and irregularities can at the very least make it difficult to obtain an effective watertight seal. Problems arise for the fitting together of the lid and roof opening, especially where a glass lid that cannot be highly accurately dimensioned is involved, from the dimensional variations that occur due to the differences in manufacturing tolerances between lid and roof opening, which cannot always be satisfactorily compensated by conventional edge gap sealing arrangements or profiles, that is cannot achieve a good watertight seal. The applied pressure at the edge gap seal is, with the described dimensional variations and irregularities, not uniformly distributed over the entire bearing surface at the peripheral rim of the roof opening, which can lead to local leakage points.

In one known edge gap sealing arrangement (see German Petty Patent No DE-G 94 18 090.3, FIGS. 3 and 4) having a hollow sealing element of the kind described above, a beading-like extension, for example generally circular in cross-section, is provided at the outer edge of the edge strip integral with the frame body. This beading-like extension is then, after the edge strip has been bent over, snap-fitted into a recess of corresponding cross-section in the frame body. Since the edge strip possesses uniform dimensions all around the lid periphery, after the edge strip has been bent over and the extension has been snap-fitted into the associated recess, a continuous edge gap seal of uniform cross-section is obtained, which extends around all sides of the lid. With this known edge gap seal it is not possible for the above described, unavoidable dimensional variations and irregularities to be completely compensated, especially when they are large, so that the risk of at least local leakages at the edge gap exists.

SUMMARY OF THE INVENTION

It is an object of this invention to provide an edge gap sealing arrangement for the lid of an automobile sliding roof having a hollow seal which can be adjusted in cross-section so that large dimensional variations and irregularities in the edge gap can be compensated, together with good sealing against the penetration of water.

It is a further object of this invention to provide an automobile opening roof arrangement comprising a lid having an edge seal moulded thereto and an aperture in the roof of the automobile defined by a peripheral surface engageable with the edge seal, the edge seal comprising a frame body engaged around a peripheral edge of the lid, a strip extending around the lid from said body to an outer extremity, said outer extremity being bent back to said body and adjustably clamped thereto, an inner surface of said strip when clamped defining with said body a hollow chamber extending within edge seal around the lid. Thus the width of the hollow chamber is continuous over one or several sides of the lid, but is also locally variable and adjustable to a limited extent. For this purpose, with the edge strip bent over and the lid closed, the inner surface portion of the edge strip is laid against the opposite surface of the frame body in such a way that the hollow portion of the edge gap seal sealingly closes the edge gap completely on all sides and with as far as possible uniform application pressure all round, against the peripheral rim of the roof opening. The adjusted relative position between an inner surface portion of the strip and frame body may be achieved by means of a clamping profile strip which acts to clamp the inner surface portion of the strip onto a counter-surface of the frame body.

In order to secure the adjusted position between inner surface portion and counter-surface, it is advantageous if these surfaces bearing against one another are provided with a surface roughening, advantageously in the form of a longitudinal grooving.

The clamping groove in the frame body may be integrally moulded into and all around the frame body and the groove defined by two mutually parallel side walls the outermost of which terminates at the counter-surface and innermost wall which extends to a support surface of a support strip projecting downwards from the frame body.

The way in which, by the provision of a holding strip at the outer edge of the edge strip, in conjunction with a hook strip provided on the clamping profile strip, the adjustment distance between the inner surface portion of the edge strip and the counter-surface of the frame body can be limited in a simple manner, while at the same time the bent-over edge strip may be secured against unintentional release of the edge strip towards its not bent-over position during the adjustment operation, is apparent from the appended claims.

DESCRIPTION OF THE PREFERRED EMBODIMENT

Figure 2:
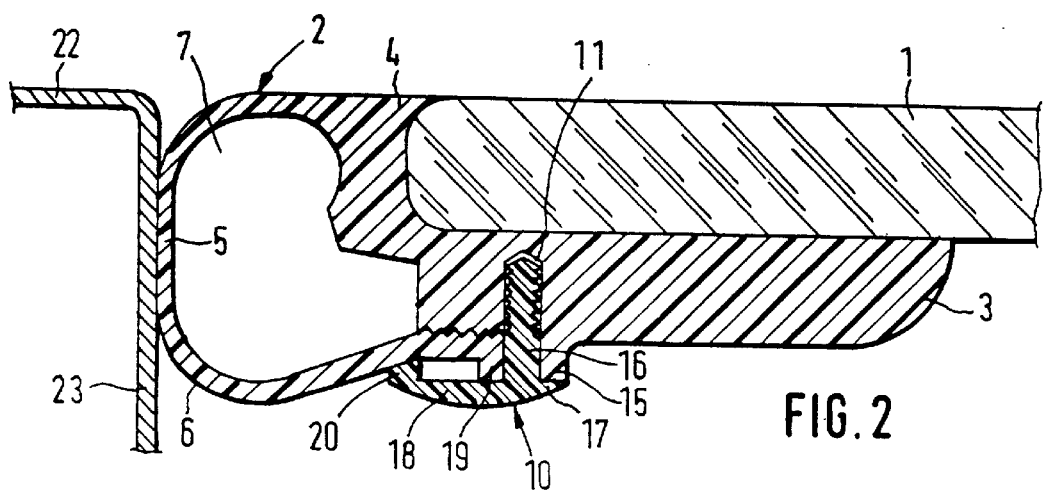
FIG. 2 is a section on the line II—II in FIG. 1 in a first form of embodiment relating to a glass lid, with the fixed roof shown partly cut away.
Figure 4:
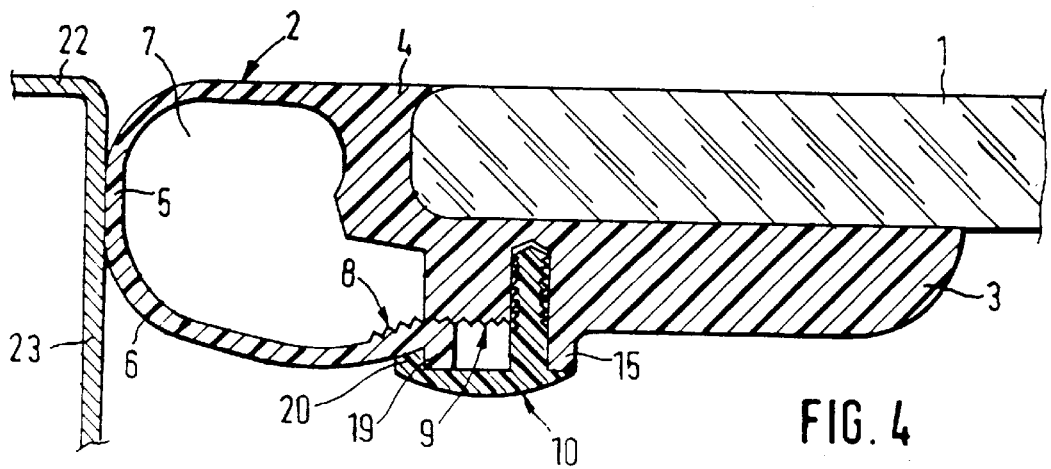
FIG. 4 is a further section similar to FIG. 2, but with a different setting of the hollow chamber width compared with FIG. 2.

In the drawings, only those regions of the rigid lid that affect the edge gap sealing arrangement are shown, and in FIGS. 2 and 4 in addition the position of the edge gap sealing arrangement relative to the fixed automobile roof. The rigid lid can be a component of any of the known sliding roof constructions, for example a component of a sliding only roof, of a sliding lifting roof, of a ventilation flap hinged only at the front or of an upper ridge sliding roof.

Figure 3:
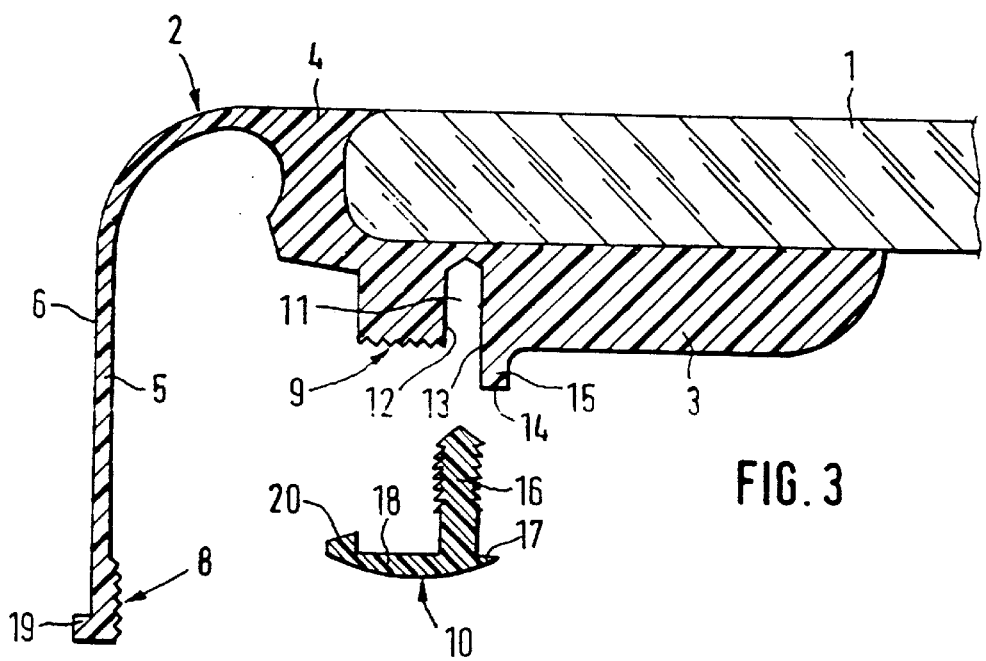
FIG. 3 is a section similar to FIG. 2, but with the hollow chamber not yet formed and with the clamping profile strip not yet fitted to the frame body.

In the first form of embodiment shown in FIGS. 2 to 4, in which the rigid lid is constructed as a glass lid 1, the edge region of the glass lid 1 is provided, all around, with a cast-on or injected-on or foamed-on, frame-like border 2 of plastics, which for example is of polyvinyl chloride or an elastomeric plastics of suitable degree of hardness, for example on a basis of polyurethane. The frame-like border 2 forms a frame body 3, which bears against the lower surface of the glass lid 1 and fits around the peripheral edge of the glass lid 1. The frame-like border 2 terminates at the top in the plane of the upper face of the glass lid 1, so that a smooth, flush position is achieved between the upper face 4 of the border 2 and the glass lid 1.

From the frame body 3 an integrally formed, free edge strip 5 extends outwards and downwards, which adjoins, with its outer surface 6, the upper face 4 of the frame body 3 in a smooth transition without steps. The edge strip 5 forms the wall of a hollow chamber 7, when the edge strip 5 is bent inwards and is secured as shown in FIGS. 2 and 4 from below in a manner yet to be described to the frame body 3, with its outer edge adjacent to the lid peripheral edge.

At the outer edge of the edge strip 5, an internal surface portion 8 is provided for this purpose, which can be secured adjustably at a complementary counter surface 9 by means of a clamping profile strip 10 for adjusting the width of the hollow chamber 7. The clamping profile strip 10 engages into a clamping groove 11, moulded all around in the frame body 3.

The inner surface portion 8 of the edge strip 5 and the complementary counter-surface 9 at the frame body 3 are provided, for the purpose of improving the adjusted position determined by the clamping profile strip 10 for the width of the hollow chamber 7, with a surface roughening, in the example shown each with a longitudinal grooving parallel to the lid peripheral edge. The longitudinally grooved internal surface portion 8 and the likewise longitudinally grooved counter-surface 9 may be of equal width, as shown particularly in FIG. 2.

The downwardly open clamping groove 11, integrally moulded into the frame body 3 all around and parallel to the lid peripheral edge, has two generally mutually parallel side walls 12 and 13. The side wall 12 that is outermost with reference to the lid peripheral edge terminates at the counter-surface 9, while the inner side wall 13 extends as far as a support surface 14 of a support strip 15 for the clamping profile strip 10, projecting downwards from the frame body 3.

The clamping profile strip 10 possesses a substantially T-shaped cross-section, of which the web 16 is formed for clamping engagement into the clamping groove 11 and possesses, for example, a "pine tree profile". In addition, the clamping profile strip has a narrower, inner flange portion 17 and a wider, outer flange portion 18. The inner flange portion 17 is intended for bearing against the support surface 14 of the support strip 15 when the clamping profile strip 10 engages completely with its web 16 into the clamping groove 11, as shown in FIGS. 2 and 4. The outer flange portion 18 bears, in a manner yet to be explained, against the outer edge of the edge strip 5, in order to secure the inner area portion 8 against the counter-surface 9 when the clamping profile strip 10 is fitted to the frame body 3.

At the outer edge of the edge strip 5, a holding strip 19, projecting out of the edge-strip, is provided. When the edge strip 5 is bent over, this holding strip 19 points downwards, as FIGS. 2 and 4 again show. Through this holding strip 19, the outer flange portion 18 of the clamping profile strip 10 presses the inner surface portion 8 against the counter-surface 9. On the outer flange portion 18, a hook strip 20 is integrally formed at the end, which bears against the edge strip 5 from below after the clamping profile strip 10 has been fitted. The adjustment travel distance between the inner surface portion 8 and the counter-surface 9 is limited, on the one hand, by abutment of the holding strip 19 against the web 16 of the clamping profile strip 10 and, on the other hand, by abutment of the holding strip 19 against the hook strip 20, as is evident from FIGS. 2 to 4.

For forming the hollow chamber 7, starting from the position shown in FIG. 3 of the edge gap sealing arrangement moulded onto the rigid lid, the edge strip 5 forming the hollow chamber wall is bent inwards on all sides towards the periphery of the lid. The grooved internal surface portion 8 thus comes into bearing against the grooved counter-surface 9 on the frame body 3. Then, the clamping profile strip is pressed with its web 16 into the clamping groove 11. The width of the hollow chamber 7 is fixed in this way. If the cross-section or the width of the hollow chamber 7 is to be varied entirely or partly, the clamping profile strip 10 is entirely or partly slightly withdrawn out of the clamping groove 11 (by the depth of the grooves), causing the engagement between the inner surface portion 8 and the counter-surface 9 to be entirely or partially cancelled. Then the inner surface portion 8 and the counter-surface 9 are displaced parallel to each other, whereupon, after the desired hollow chamber dimensions have been reached, the clamping profile strip 10 is again entirely or partly pressed into the clamping groove 11. When the web 16 is pulled out of the clamping groove 11, the hook strip 12, in conjunction with the holding strip 19, prevents complete escape of the edge strip 5 from the gap between the counter-surface 9 and the outer flange portion 18 of the clamping profile strip 10. As already mentioned, the hook strip 20 not only ensures a travel-limiting abutment of the holding strip 19, but also supports the edge strip 5 from below, so that the inner area portion 8 and the counter-surface 9 are held in engagement.

Figure 1:
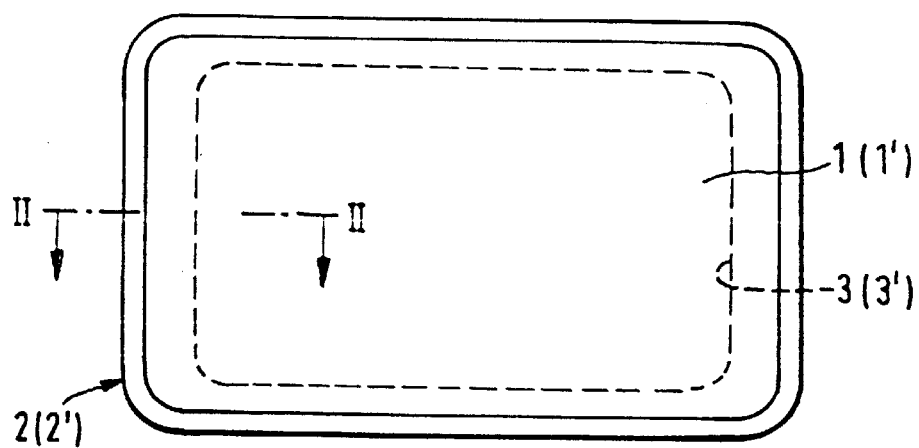
FIG. 1 is a plan of a lid of an automobile sliding roof, equipped with the edge gap sealing arrangement according to the invention.
Figure 5:
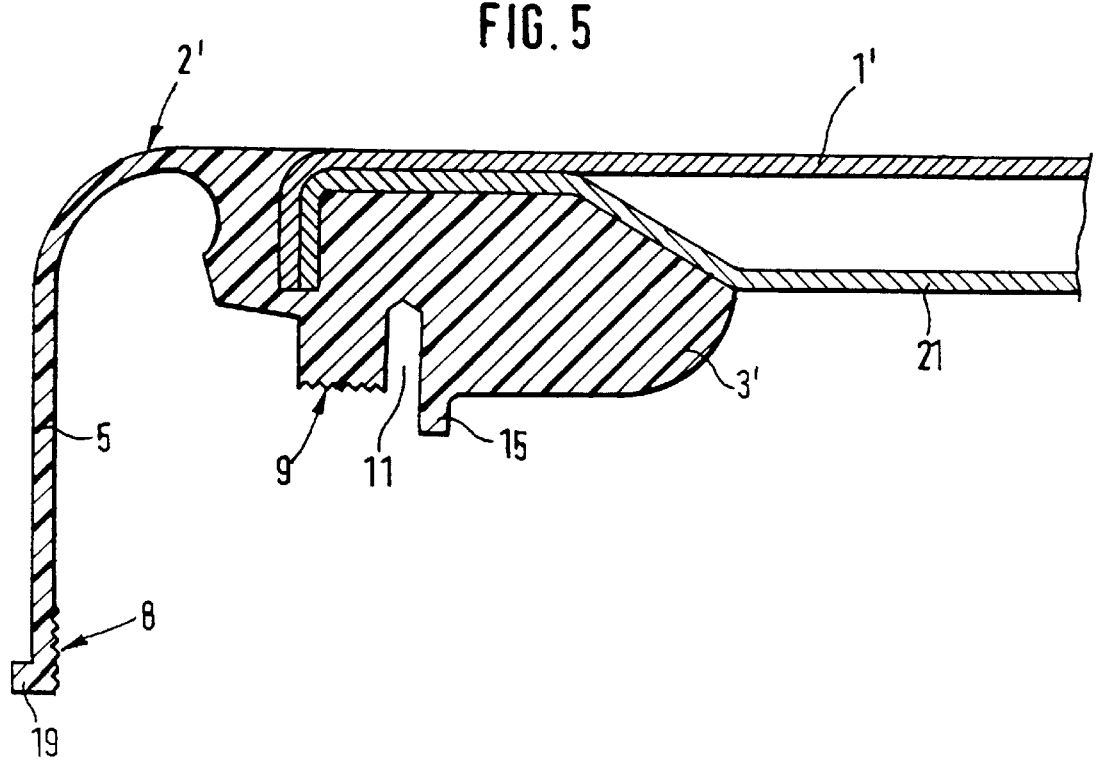
FIG. 5 is a section similar to FIG. 3 in a second form of construction, relating to a sheet metal lid, without the clamping profile strip illustrated.

In the example of embodiment according to FIG. 5, instead of a glass lid a sheet metal lid 1' is provided. This is underlain, in its edge region, in the usual way by a reinforcing frame 21. Sheet metal lid 1 and reinforcing frame 21 are cranked downwards at the outer edge, and the frame-like border 2' is moulded onto the sheet metal lid 1' in such a way as to enclose these downward flanges. The frame-like border 2' and the frame body 3' are in other respects constructed in the same way as described with reference to the first example of embodiment.

In FIGS. 2 and 4, the fixed automobile roof 22 which, when the lid is closed, lies in the same plane as the lid, is illustrated. The roof opening which, in the closed position of the lid, is closed by the lid 1 or 1' through the intermediary of the portion of the edge gap sealing arrangement possessing the hollow chamber 7, is bounded by a vertically downwardly orientated edge flange of the fixed automobile roof 22. The flange 23 constitutes the peripheral rim of the roof opening and the bearing surface for the edge gap sealing arrangement.

The clamping profile strip 10 can be produced as an extruded profile from a suitable plastics material.

While a preferred embodiment has been shown and described, it will be understood that there is no intent to limit the invention to such disclosure, but rather it is intended to cover all modifications and alternate constructions falling within the spirit and scope of the invention as defined in the appended claims.

What is claimed is:

1. An automobile roof opening arrangement, comprising:

a lid having an outer periphery;

an edge seal supported on said lid outer periphery and including a body portion having two surfaces, a generally flexible free edge strip extending generally away from one of said body surfaces and having a terminal end that is supported adjacent the other of said body surfaces such that said free edge strip forms a chamber, said chamber having a cross-sectional dimension and a length that is generally transverse to said cross-sectional dimension, said free edge strip being generally flexible along said entire length; and a clamping member supported by said body portion such that said clamping member holds said terminal end of said free edge strip in abutting engagement with said other said body surface, said clamping member comprising a clamping profile strip having a substantially T-shaped cross-section with a web portion, an inner flange portion and an outer flange portion, wherein said body portion includes a clamping groove in which said web is received in clamping engagement, said inner flange portion bearing against a corresponding surface on said body portion when said web is received within said clamping groove, said outer flange portion bearing against said free edge strip terminal end, said free edge strip being adjustably held by said clamping member such that a position of said terminal end relative to said body portion is selectively adjustable along said length into at least two of a plurality of positions relative to said body portion.

2. The arrangement of claim 1, wherein said clamping profile strip includes a hook strip and said terminal end of said free edge strip includes a holding strip and wherein said hook strip abuttingly engages said holding strip when said channel cross-sectional dimension is at a maximum.

3. The arrangement of claim 1, wherein said other body surface includes a plurality of ridges aligned generally parallel with said length and wherein said terminal end of said free edge strip includes a plurality of ridges aligned generally parallel with said length and wherein said body surface ridges at least partially engage said free edge strip ridges when said terminal end of said free edge strip is placed against said other body portion surface.

4. The arrangement of claim 1, wherein said body portion includes a clamping groove and said clamping member includes a first portion that is received within said clamping groove and a second portion extending generally perpendicular to said first portion, said second portion of said clamping member abutting said terminal end of said free edge strip and wherein said first portion of said clamping member is selectively moved within said clamping groove to selectively hold said terminal end of said free edge strip against said body portion other surface.

5. The arrangement of claim 1, wherein said body portion includes a counter surface and said free edge strip terminal end includes a corresponding inner surface portion adjacent said terminal end, and wherein said outer flange portion biases said inner surface portion against said counter surface to thereby secure said inner surface portion against said counter surface when said clamping profile strip is appropriately supported by said body portion.

6. The arrangement of claim 1, further comprising a holding strip adjacent said terminal end of said free edge strip and wherein said outer flange portion includes a hook strip and wherein said hook strip and said holding strip cooperate to define a maximum of said cross-sectional dimension.

* * * * *